United States Patent
Maeda

(10) Patent No.: US 7,460,263 B2
(45) Date of Patent: Dec. 2, 2008

(54) STATUS INFORMATION OBTAINING METHOD, APPARATUS, PROGRAM, AND STORING MEDIUM

(75) Inventor: Masao Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 10/951,685

(22) Filed: Sep. 29, 2004

(65) Prior Publication Data

US 2005/0141005 A1   Jun. 30, 2005

(30) Foreign Application Priority Data

Oct. 2, 2003   (JP)   ............... 2003-344932

(51) Int. Cl.
  *G06F 15/00*   (2006.01)
  *B41J 1/00*   (2006.01)
(52) U.S. Cl. .................... 358/1.15; 358/1.13
(58) Field of Classification Search .......... 358/1.1, 358/1.8, 1.9, 1.13, 1.14, 1.15, 1.18, 400, 358/407, 408; 705/1, 14, 58; 709/201, 208, 709/209, 248; 399/9, 10
See application file for complete search history.

(56) References Cited

U.S. PATENT DOCUMENTS

| 5,220,674 | A | * | 6/1993 | Morgan et al. | ............... 709/223 |
| 5,706,411 | A | * | 1/1998 | McCormick et al. | ........ 358/1.14 |
| 6,099,181 | A | * | 8/2000 | Kitabatake | ................... 400/710 |
| 7,310,164 | B2 | * | 12/2007 | Matoba | ..................... 358/1.15 |
| 7,321,440 | B2 | * | 1/2008 | Kimura | ..................... 358/1.15 |
| 2002/0114006 | A1 | * | 8/2002 | Matoba | ..................... 358/1.15 |
| 2002/0159090 | A1 | * | 10/2002 | Nobutani et al. | ........... 358/1.15 |
| 2003/0107761 | A1 | * | 6/2003 | Kimura | ..................... 358/1.15 |

FOREIGN PATENT DOCUMENTS

JP   08-185286   7/1996

* cited by examiner

*Primary Examiner*—Gabriel I Garcia
(74) *Attorney, Agent, or Firm*—Fitzpatrick, Cella, Harper & Scinto

(57) ABSTRACT

When it is determined that a device ID request has been made by a master apparatus, a slave apparatus returns device ID information including the latest status information to the master apparatus, starts a status information collecting process for newly collecting status information after the return of the device ID information, measures whether or not a predetermined time has elapsed from a point of time after completion of the latest status information collecting process, and returns period elapse information showing whether or not the predetermined time has elapsed on the basis of a result of the measurement together with the device ID information.

16 Claims, 13 Drawing Sheets

STATUS INFORMATION OBTAINING METHOD, APPARATUS, PROGRAM, AND STORING MEDIUM

BACKGROUND OF THE INVENTION

1. Field of the Invention

The invention relates to information obtaining method, apparatus, and program for obtaining information of a peripheral apparatus.

2. Related Background Art

Hitherto, various systems have been proposed as systems for providing a status information obtaining method whereby an information processing apparatus as a master apparatus side obtains status information showing a present status of a peripheral apparatus as a slave apparatus side.

For example, in a system in which a host computer and a printer are connected, in order to allow the host computer to obtain information regarding a status of the printer, generally, there is used a method whereby a printer information obtaining request command is issued from the host computer by using a forward direction channel to the printer and printer information is returned from the printer by using a backward direction channel to the host computer by using a bidirectional interface.

For example, in a printer having a plurality of interfaces, a method whereby by allowing the printer status to be included in a device ID, while a print job is being executed by one interface, the printer information can be obtained from another interface has been disclosed (refer to Japanese Patent Application Laid-open No. H08-185286).

An object for reflecting the printer information to various processes at the time of forming print job data can be mentioned as a method of obtaining the printer information.

However, in dependence on a type of OS which operates on the host computer, there is a case where the timing when the communication channels in forward direction and the backward direction can be used is limited to the timing when the print job data is formed and transferred to the printer. In that case, there is a problem that the printer information cannot be obtained at earlier timing, for example, timing before the print job data is formed, before a print job is activated from an application, or the like.

SUMMARY OF THE INVENTION

As a method of solving the above problems, there is a method of allowing printer information to be included in a device ID character string of a device which can operate independent of a communication channel for transferring print job data. By this method, a host computer side can obtain printer information any time without using the communication channel.

However, a printer side always needs to monitor and grasp the latest printer information so that the printer can transmit the latest printer information whenever a device ID is requested.

Particularly, even when the printer is in a still mode, the printer side has to "always" monitor a type and a size of recording media set in the printer and situations of the operation which is executed by the user to the printer such as states of various switches and levers provided for the printer and the like. However, in many cases, it is actually difficult to always grasp the latest information as mentioned above.

For example, in a printer information collecting process on the printer side, when a sensor circuit or the like consumes an electric power, if the printer information is always monitored for 24 hours, a large electric power is consumed even in the printer still mode, or there is also a case of occurrence of such limitation in terms of working efficiency that the number of executing times of the information collecting process has to be suppressed as possible due to a relation between a life of the sensor circuit or the like and a life of a product.

Therefore, as a conventional method, generally, there is a method whereby the printer side periodically executes the printer information collecting process "at predetermined intervals".

However, according to such a method of periodically executing such a process, there is a case where "omission of monitoring" occurs when the user operates the printer within the predetermined interval. Even in the case where the host computer does not need the printer information, although the number of executing times of the information collecting process has been reduced at regular intervals, the unnecessary information collecting process is still executed, so that there is a limitation in terms of the working efficiency.

It is an object of the invention to provide at least one of methods of solving the foregoing problems. It is, therefore, a feature of the invention to provide status information obtaining method, apparatus, program, and storing medium, in which an information processing apparatus can non-periodically obtain latest status information showing a latest status regarding a peripheral apparatus only when it is needed, such a non-periodic obtaining process on the information processing apparatus side is not always forcedly executed but executed also in consideration of a working situation on the peripheral apparatus side, so that the wasteful operations of not only the information processing apparatus but also the peripheral apparatus can be eliminated and operating efficiency can be improved maximally.

According to an aspect of the invention, there is provided a method of obtaining status information showing a status of a peripheral apparatus by an information processing apparatus in a system including the information processing apparatus and the peripheral apparatus which are mutually connected by an interface, wherein the method allows the peripheral apparatus to execute: a step of discriminating whether or not a device ID request has been made by the information processing apparatus; a step of, when it is determined that the device ID request has been made, returning device ID information including the latest status information to the information processing apparatus and starting a status information collecting process for newly collecting status information after the return of the device ID information; a step of measuring whether or not a predetermined time has elapsed from a point of time after completion of the latest status information collecting process; and a step of returning period elapse information showing whether or not the predetermined time has elapsed on the basis of a result of the measurement together with the device ID information. According to the invention, consequently, there are also provided a status information obtaining method and an apparatus and a program to which such a method can be applied.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the invention will now be described in detail hereinbelow with reference to the drawings.

For example, in a system in which a master apparatus and a slave apparatus are connected through communicating means, the invention provides a latest status information obtaining method whereby the master apparatus obtains latest status information showing a present status of the slave apparatus. For example, in a system comprising a host computer and a printer which are mutually connected by an interface such as IEEE1284, USB, or the like, the invention relates to a method whereby the host computer obtains latest printer information showing a present latest printer information of the printer.

As a system construction of the invention, a personal computer or a host computer is used as a master apparatus and a copying apparatus, a facsimile, a printer, an information terminal, another apparatus showing an operating status, or the like can be used as a slave apparatus. In the following example, however, explanation will be made with respect to the case where the system is constructed by using the host computer as a master apparatus and using the printer as a slave apparatus.

Embodiment 1

The first embodiment of the invention will now be described with reference to FIGS. 1 to 8.

Figure 2:
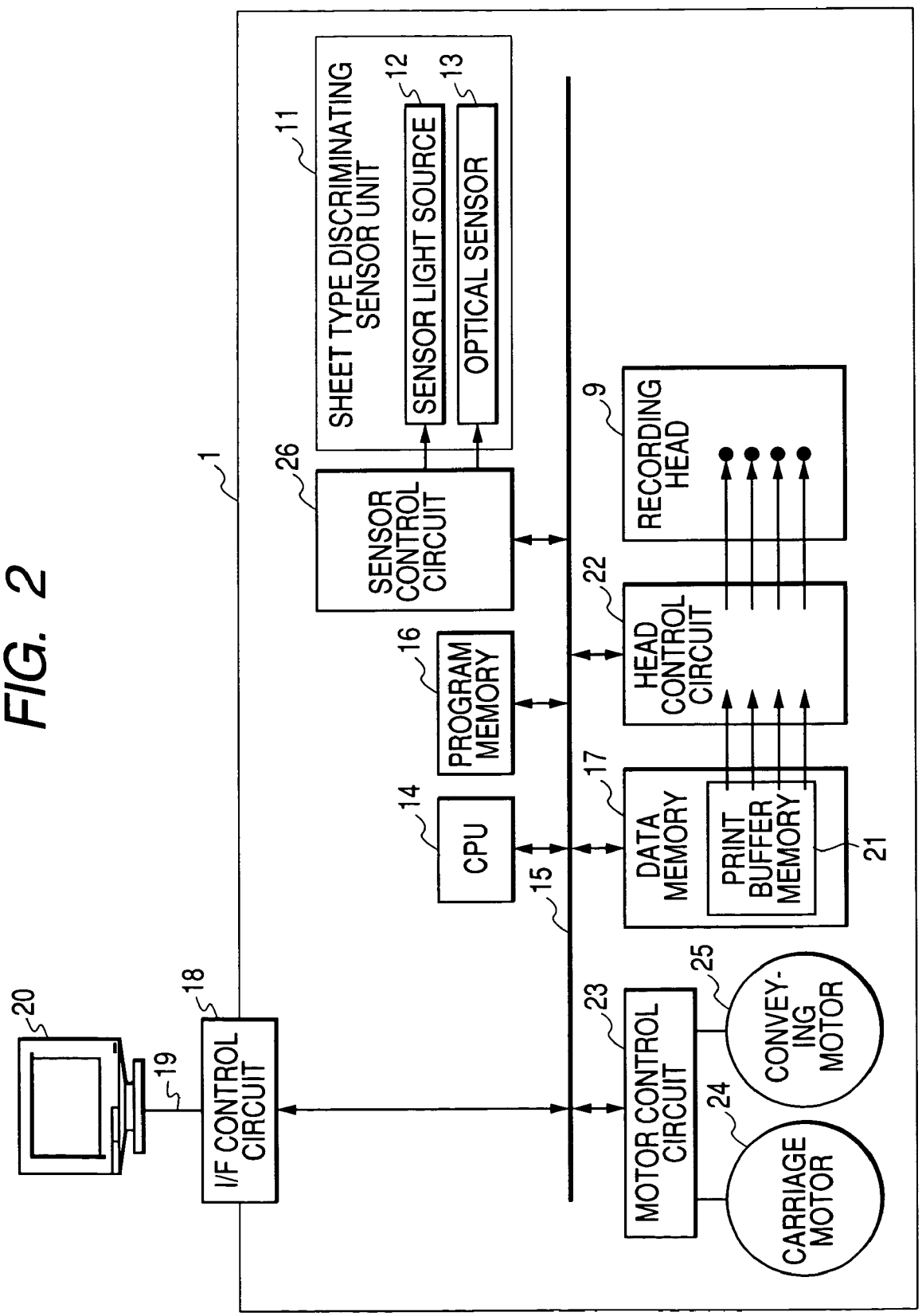
FIG. 2 is a block diagram showing a construction of a control system of the printer in a present system.

In this example, as shown in FIG. 2, in a system comprising a host computer 20 and a printer 1 which are mutually connected by an interface such as IEEE1284, USB, or the like, a method whereby the host computer 20 obtains printer information (latest status information) showing a present latest printer status of the printer 1 will now be described.

<System Construction>

First, a whole construction of the system will be described.

(Printer Construction)

Figure 1:
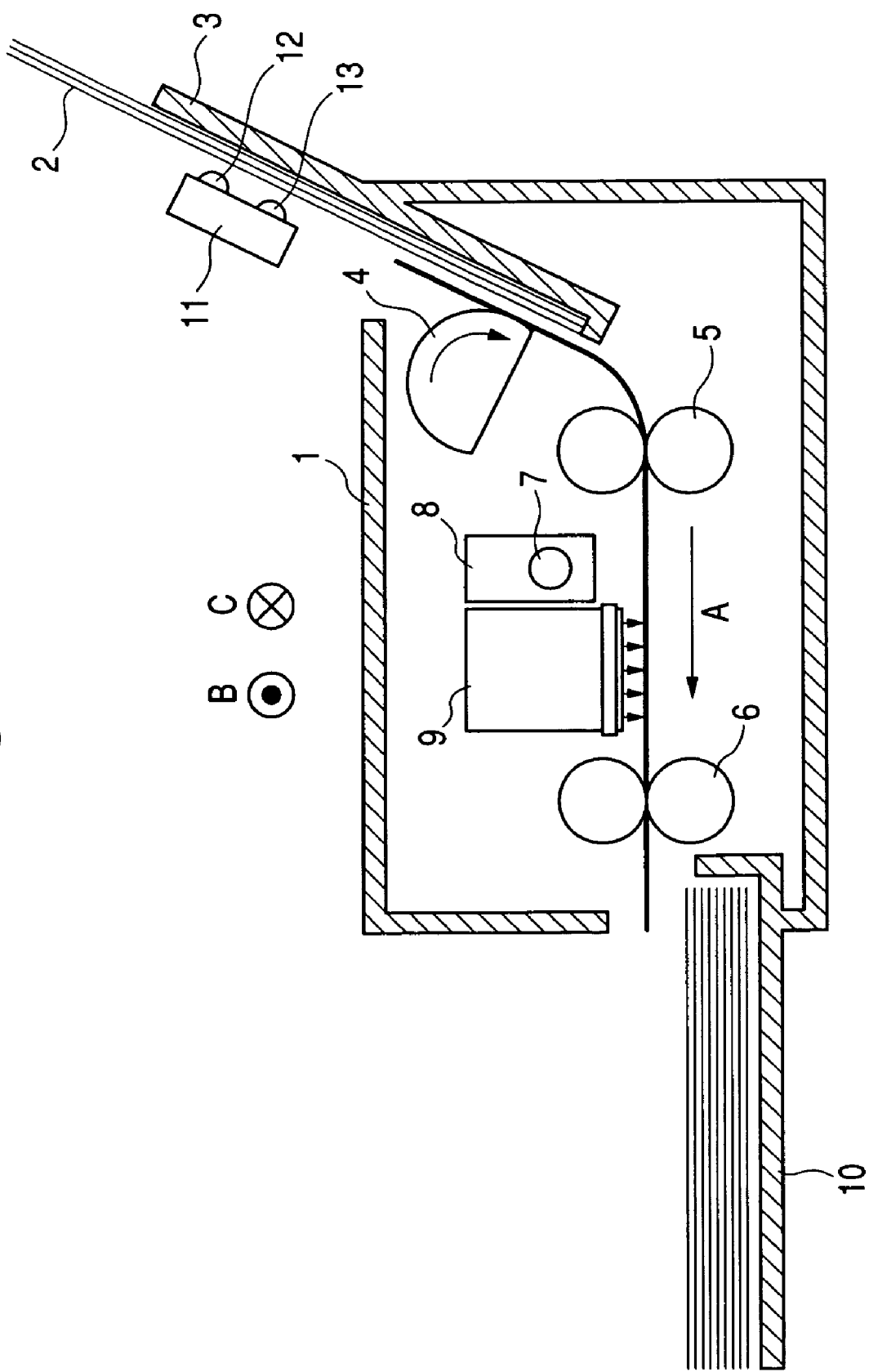
FIG. 1 is a cross sectional view showing a construction of a printer according to the first embodiment of the invention.

FIG. 1 shows a construction of the printer 1 in this example.

Sheet-like recording media 2 are stacked on a paper feed tray 3 and picked up one by one by a paper feed roller 4. The recording medium 2 picked up by the paper feed roller 4 is supported by conveying rollers 5 and 6 which are driven by a conveying motor (not shown) and conveyed in the direction shown by an arrow (A). A guide shaft 7 is provided between the conveying rollers 5 and 6 in parallel with those rollers. A recording head 9 is mounted on a carriage 8 which reciprocates on the guide shaft 7 in the directions shown by arrows (B and C). By applying a driving pulse while moving a carriage 8 by a carriage motor (not shown), the recording operation of one scan is executed.

The recording medium 2 is conveyed by every specified amount in the direction of the arrow (A) by the conveying rollers 5 and 6 every scan print recording operation of the carriage 8. By repeating the above operation, the print recording of one page of the recording medium 2 is completed. The recording medium 2 after completion of the print recording is conveyed as it is in the direction of the arrow (A) by the conveying rollers 5 and 6 and ejected and stacked onto a paper ejecting tray 10.

An optical sheet type discriminating sensor unit 11 is provided in a position where it faces the recording medium 2 set on the paper feed tray 3. In the state where a sensor light source 12 in the sheet type discriminating sensor unit 11 is made operative so as to emit a predetermined amount of light, an amount of light reflected by the recording medium 2 is measured by an optical sensor 13 in the sheet type discriminating sensor unit 11, so that a type of recording medium 2 set on the paper feed tray 3 can be discriminated.

(Printer Control System)

FIG. 2 shows a construction of a control system of the printer 1.

A CPU 14 in a form of a microprocessor operates in accordance with a control program stored in a program memory 16 in a form of a ROM connected to the CPU 14 through an internal bus 15 and contents in a data memory 17 in a form of a RAM also connected to the CPU 14 through the internal bus 15. The CPU 14 receives print recording data from the host computer 20 connected to an interface control circuit 18 through an interface cable 19 and stores it into a print buffer memory 21 in the data memory 17.

The print recording data developed in the print buffer memory 21 is read out by a head control circuit 22 and sent to the recording head 9.

The CPU 14 can control a carriage motor 24 and a conveying motor 25 through a motor control circuit 23. The print recording is executed by controlling by combining those operations.

The CPU 14 can control the light amount of the sensor light source 12 in the sheet type discriminating sensor unit 11 through a sensor control circuit 26 and obtain the amount of the reflection light which is detected by the optical sensor 13 in the sheet type discriminating sensor unit 11.

(Task Construction)

Figure 3:
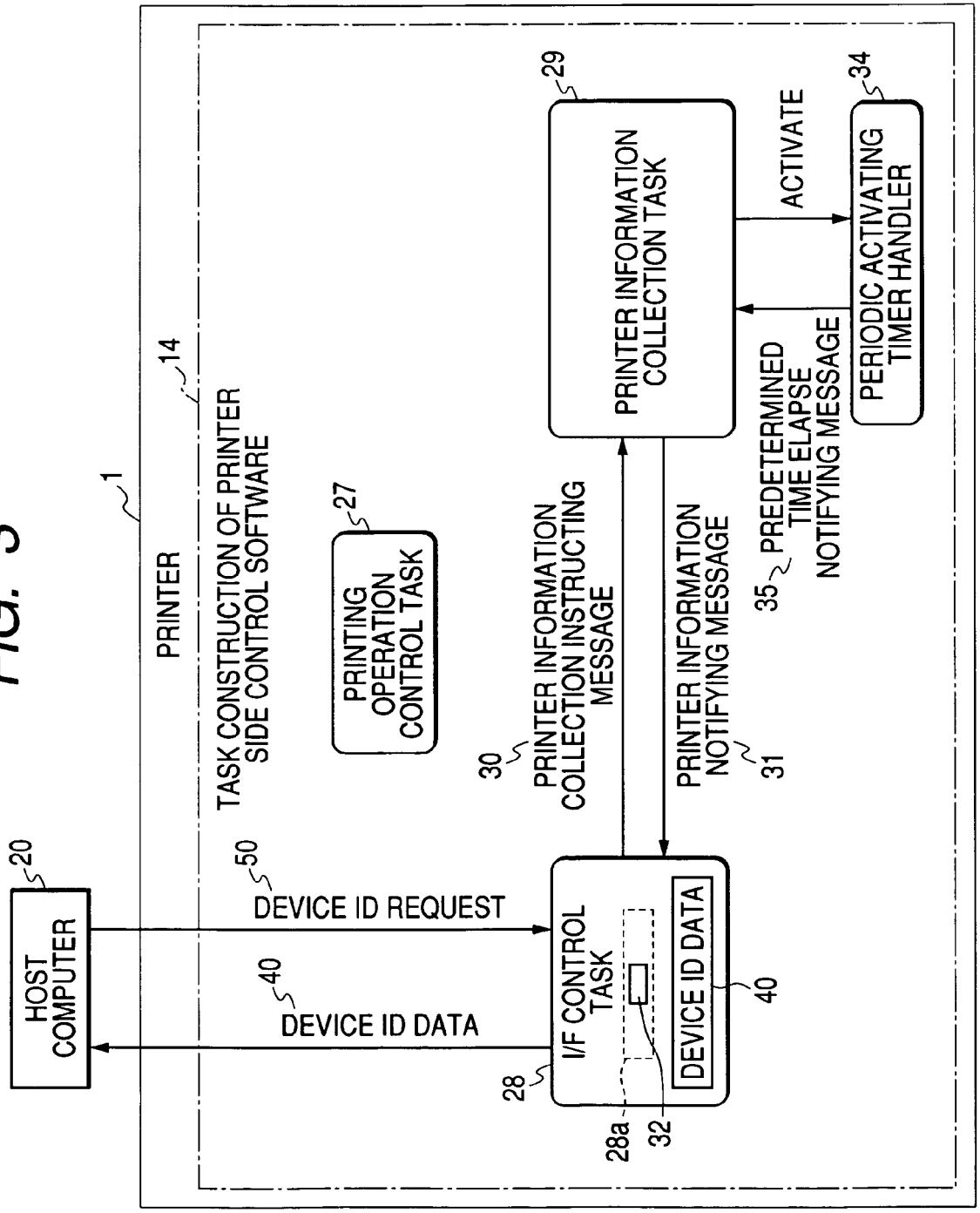
FIG. 3 is a block diagram showing a part of a task construction of printer side control software.

FIG. 3 shows a task construction of printer side control software which operates on the CPU 14. The printer side control software is constructed on a multitask system and comprises a plurality of tasks such as printing operation control task 27, interface control task 28, printer information collection task 29, and the like.

Communication is mutually made among those tasks 27, 28, and 29 by transmitting and receiving messages. A printer information collection instructing message 30 is sent from the interface control task 28 to the printer information collection task 29. A printer information notifying message 31 is sent from the printer information collection task 29 to the interface control task 28.

A periodic activating timer handler 34 is provided in dependence on the printer information collection task 29. When the periodic activating timer handler 34 is activated from the printer information collection task 29, the handler 34 transmits a predetermined time elapse notifying message 35 (period elapse notifying message) to the printer information collection task 29 after the elapse of a predetermined period of time (predetermined time here). In the embodiment, it should be noted that the communicating method is not limited to the message communication. Information can be also transmitted and received among the apparatuses by packet communication which does not conform with a method of the message communication or communication by a signal line.

Figure 4A:
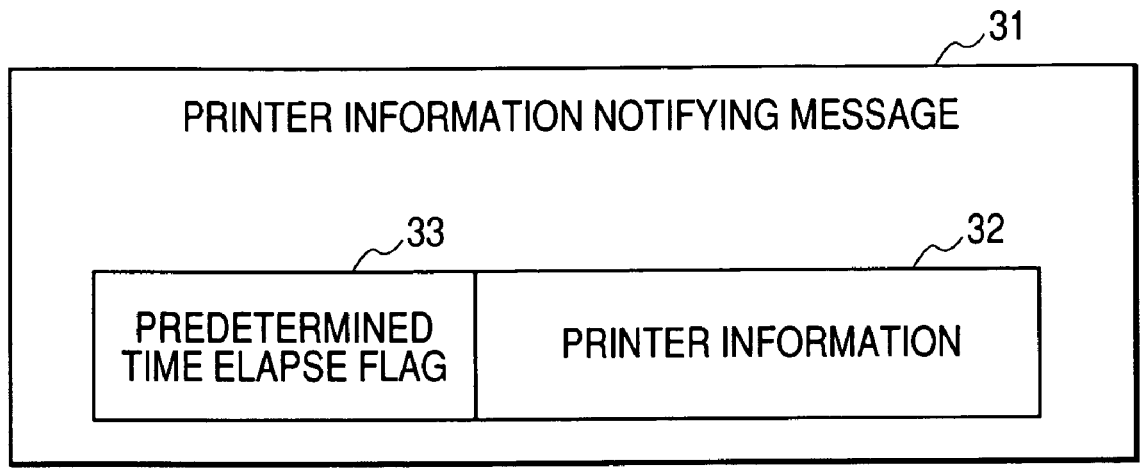
FIGS. 4A and 4B are explanatory diagrams each showing an example of a construction of information which is transferred.
Figure 4B:
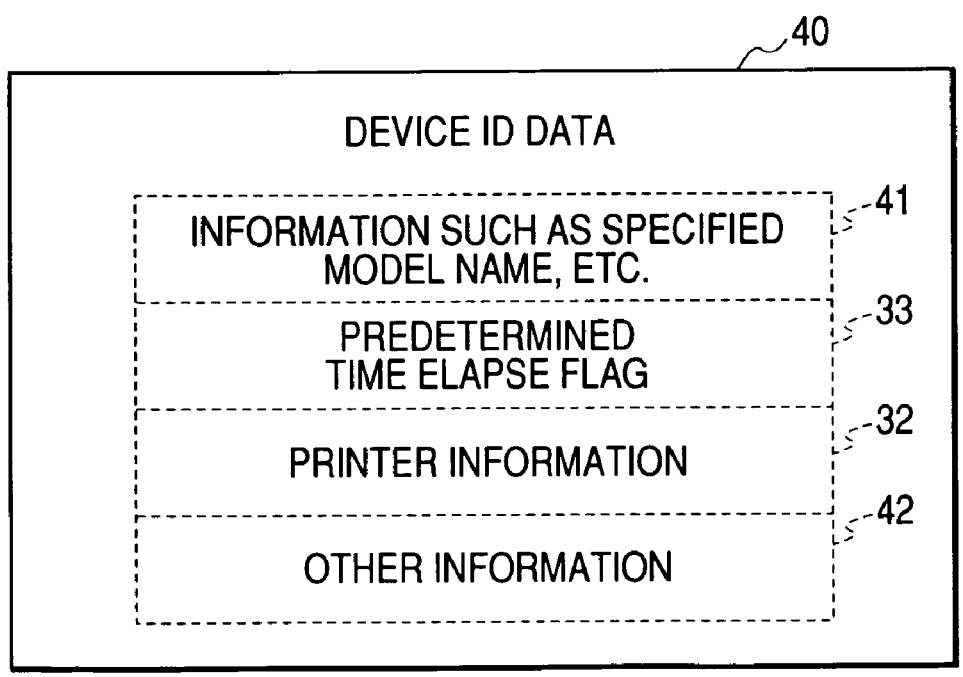

FIGS. 4A and 4B show contents of information which is transferred.

FIG. 4A shows a construction of the printer information notifying message 31. The printer information notifying message 31 is information which is transferred from the printer information collection task 29 to the interface control task 28. Collected printer information 32 and a predetermined time elapse flag 33 showing whether or not a predetermined time has elapsed from the obtainment of the printer information 32 are included in the printer information notifying message 31.

FIG. 4B shows a construction of device ID data 40. The device ID data 40 is information which is returned from the printer 1 to the host computer 20 in response to a device ID request 50 (device ID request command) which is transmitted from the host computer 20 to the printer 1. Information 41 such as a predetermined model name or the like specified by IEEE1284, USB, or the like, the predetermined time elapse flag 33, printer information 32, other information 42, and the like are included in the device ID data 40.

In this case, as printer information 32 which is obtained by the host computer 20, in addition to the case where information regarding the printer operation such as operating mode of the printer 1, error cause, and the like is obtained and notified to the user, there is the following information regarding the situation of the operation which is executed to the printer 1 by the user: a type and a size of the recording media set in the printer 1; states of various switches and levers provided for the printer; attaching states of optional devices which can be selectively attached/removed to/from the printing apparatus; and the like.

<System Operation>

The operation of the present system will now be described.

(Interface Control Task Process)

Figure 5:
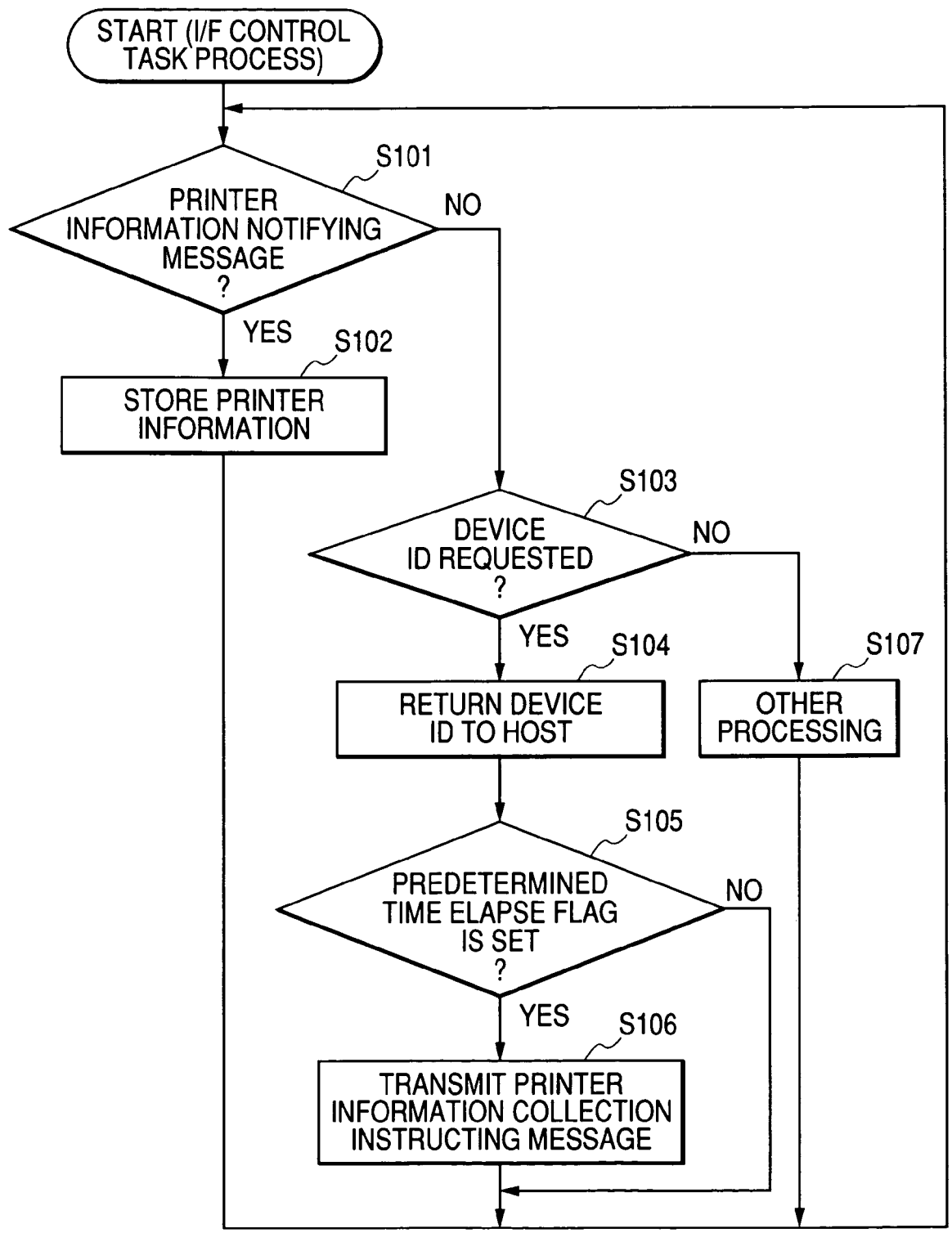
FIG. 5 is a flowchart showing an interface control task process.

FIG. 5 is a flowchart showing processing contents of the interface control task 28.

When the interface control task 28 receives the printer information notifying message 31 from the printer information collection task 29 (step S101), it stores this message into its own work area 28a (step S102).

If it is detected in step S103 that-the device ID request 50 has been made by the host computer 20, the interface control task 28 forms the device ID data 40 by using the printer information 32 stored in the work area 28a and returns it (step S104).

In addition to the information 41 such as a model name or the like specified by IEEE1284 as shown in FIG. 4B, the printer information 32 and the predetermined time elapse flag 33 are also included in the device ID data 40 in a manner similar to the printer information notifying message 31.

Subsequently, the interface control task 28 examines the predetermined time elapse flag 33 in the device ID data 40 returned in step S104 (step S105).

If the predetermined time elapse flag 33 has been set, the printer information collection instructing message 30 is transmitted to the printer information collection task 29 (step S106).

(Printer Information Collection Task Process)

Figure 6:
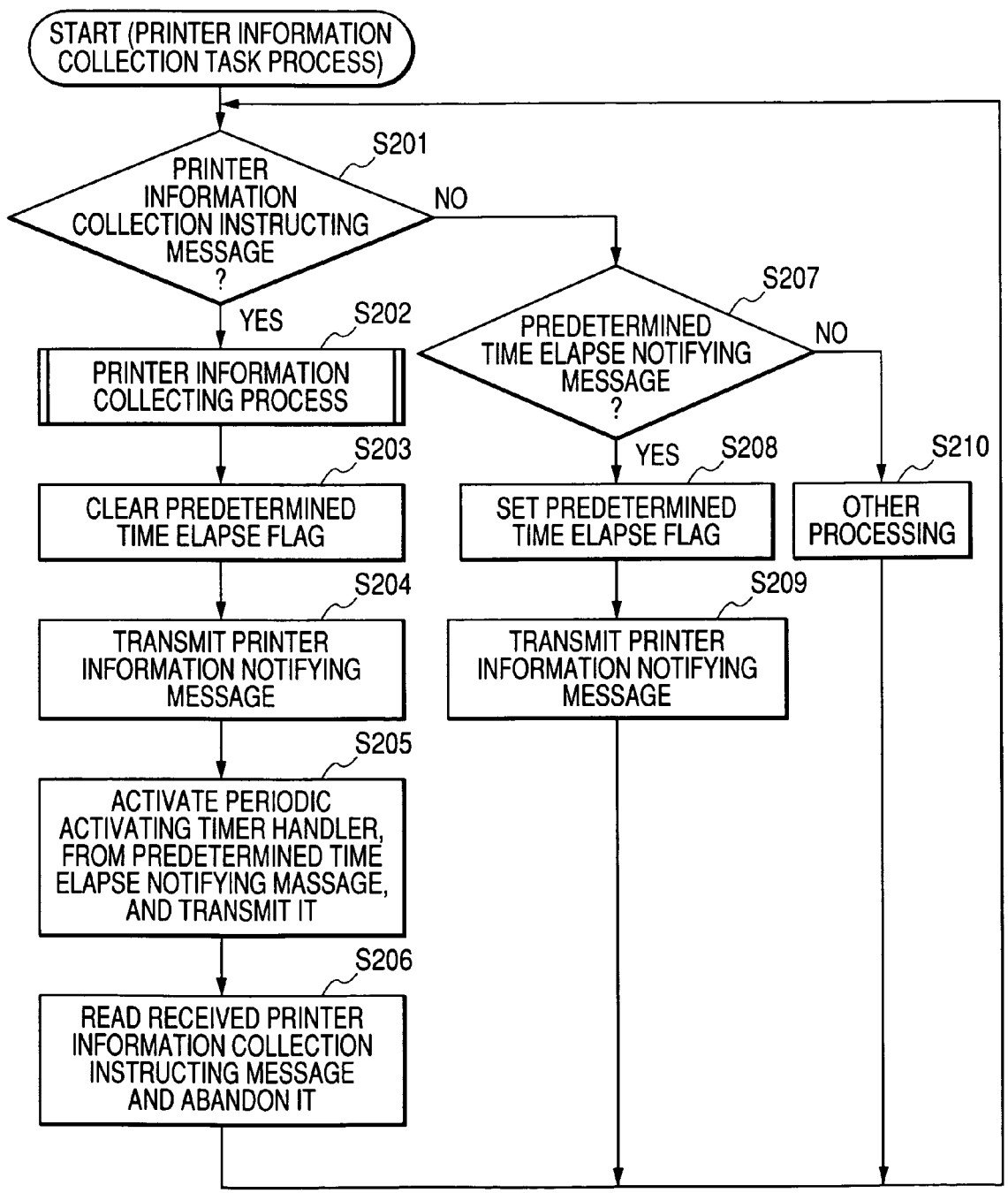
FIG. 6 is a flowchart showing a printer information collection task process.

FIG. 6 is a flowchart showing processing contents of the printer information collection task 29.

When the printer information collection task 29 receives the printer information collection instructing message 30 from the interface control task 28 (step S201), the task 29 executes a printer information collecting process (step S202). The printer information collecting process will be described hereinafter.

After completion of the printer information collecting process, the predetermined time elapse flag 33 in the printer information notifying message 31 to be transmitted is cleared (step S203).

The printer information notifying message 31 is transmitted to the interface control task 28 (step S204). At this time, the predetermined time elapse flag 33 of the printer information notifying message 31 to be transmitted is transmitted in the state where it has been cleared.

Subsequently, the printer information collection task 29 activates the periodic activating timer handler 34 and starts to measure the elapse of a predetermined time (step S205). The periodic activating timer handler 34 operates independent of the printer information collection task 29. When the periodic activating timer handler 34 is activated from the printer information collection task 29, it starts to measure the elapse of the predetermined time, forms the predetermined time elapse notifying message 35 after the elapse of a predetermined period of time, and sends the predetermined time elapse notifying message 35 to the printer information collection task 29.

The processing routine further advances to step S206 and if the next printer information collection instructing message 30 is received during the execution of the printer information collecting process, the received messages are read out and abandoned.

In step S207, if the predetermined time elapse notifying message 35 showing the elapse of the predetermined time is received from the periodic activating timer handler 34, the predetermined time elapse flag 33 is set (step S208).

The printer information notifying message 31 is transmitted to the interface control task 28 (step S209). At this time, the predetermined time elapse flag 33 of the printer information notifying message 31 to be transmitted is transmitted in the set state.

As a modification, in the process of the printer information collection task 29, control can be also made in such a manner that if the device ID request 50 is made by the host computer 20 for the elapse of the predetermined time from the point of time after completion of the new printer information collecting process, the printer information collecting process in response to the device ID request 50 is not started.

(Printer Information Collecting Process)

Figure 7:
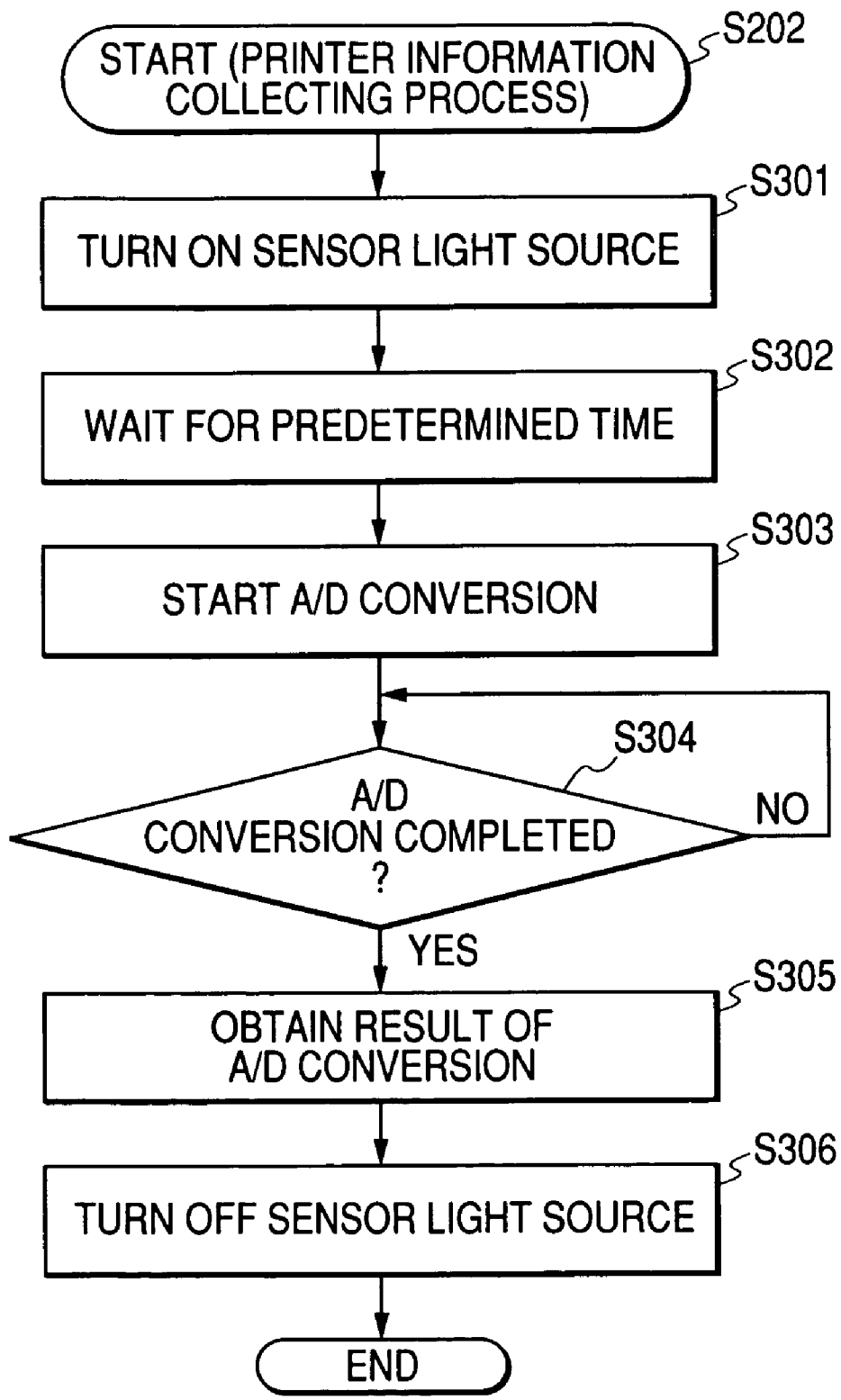
FIG. 7 is a flowchart showing details of a printer information collecting process.

FIG. 7 is a flowchart showing details of the printer information collecting process (step S202) in the process of the printer information collection task 29 described in FIG. 6.

The printer information collection task 29 turns on the sensor light source 12 in the sheet type discriminating sensor unit 11 through the sensor control circuit 26 so as to emit a predetermined amount of light (step S301) and, thereafter, executes a waiting process for a predetermined time until the light amount of the sensor light source is stabilized (step S302).

Subsequently, the printer information collection task 29 starts a process for obtaining the reflection light amount. To obtain an output voltage of the optical sensor as a digital value, the task 29 starts the converting operation of an analog/digital (A/D) converting circuit in the sensor control circuit 26 (step S303).

After waiting for completion of the A/D conversion (step S304), a result of the conversion is obtained as a reflection light amount detection result (step S305).

Finally, the printer information collection task 29 turns off the sensor light source 12 (step S306) and, thereafter, finishes the printer information collecting process.

(Printer Information Obtaining Process on the Host Side)

Figure 8:
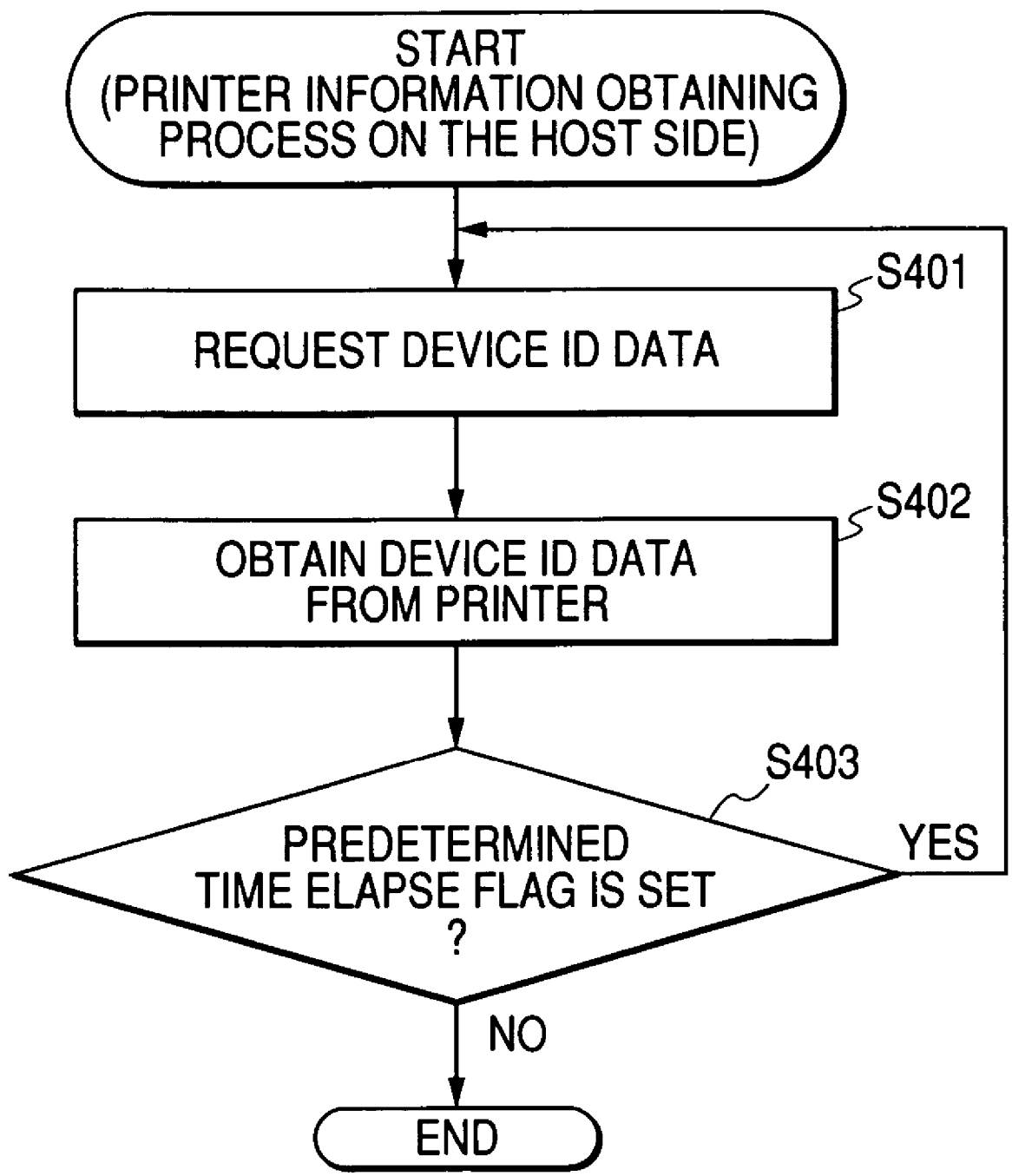
FIG. 8 is a flowchart showing a printer information obtaining process on a host computer side.

FIG. 8 is a flowchart showing processing contents in the case where the host computer 20 obtains the printer information 32.

When the host computer 20 obtains the printer information 32, it makes the device ID request 50 for obtaining the device ID data 40 to the printer 1 (step S401).

After that, the device ID data 40 returned from the printer 1 is obtained in response to such a request (step S402).

The printer information 32 included in the returned device ID data 40 is examined and the predetermined time elapse flag 33 is checked (step S403).

If the predetermined time elapse flag 33 has been set, the host computer 20 returns the processing routine to step S401 and requests again the device ID data 40 from the printer 1.

If the predetermined time elapse flag 33 is not set in step S403, the printer information 32 at that time is used and the printer information obtaining process is finished.

By executing such a process, since the data is certainly returned not only when the host itself needs the printer information 32 but also after the elapse of the predetermined time, the host computer 20 can obtain the latest printer information at any time.

Since the printer 1 side does not execute the printer information collecting process at all unless the device ID request 50 is made by the host computer 20, the unnecessary printer information collecting process is not wastefully executed.

As a modification, the host computer 20 can also control in such a manner that in the obtaining process of the device ID data 40 which does not need the latest printer information 32, even if the first flag has been set, the obtaining process for repetitively obtaining the device ID data 40 is not executed.

In the printer 1, it is also possible to make control in such a manner that in the case where the device ID request 50 is made by the host computer 20 during the execution of the latest printer information collecting process, the latest printer information collecting process in response to the device ID request 50 is not started.

That is, although there is a case where the device ID request 50 from the host computer 20 is issued for a purpose other than the printer information obtaining purpose, the printer 1 side completes the response of the device ID itself irrespective of whether or not the printer information obtaining process is executed. Therefore, on the host computer 20 side, even if the predetermined time elapse flag 33 has been set to the high level, it is sufficient that the repetitive obtainment of the device ID data 40 is not executed but the printer information obtaining process is finished and the printer information 32 is ignored. Consequently, such a problem that the next process of the host computer 20 side is delayed does not occur.

Embodiment 2

The second embodiment of the invention will now be described with reference to FIGS. 9 to 13. Substantially the same portions as those in the foregoing embodiment 1 are designated by the same reference numerals and its explanation is omitted here.

The second embodiment will be explained with respect to an example of the case where the printer information collecting process cannot be executed during the execution of a print job.

<System Construction>

A construction of the present system will be described.

Figure 9:
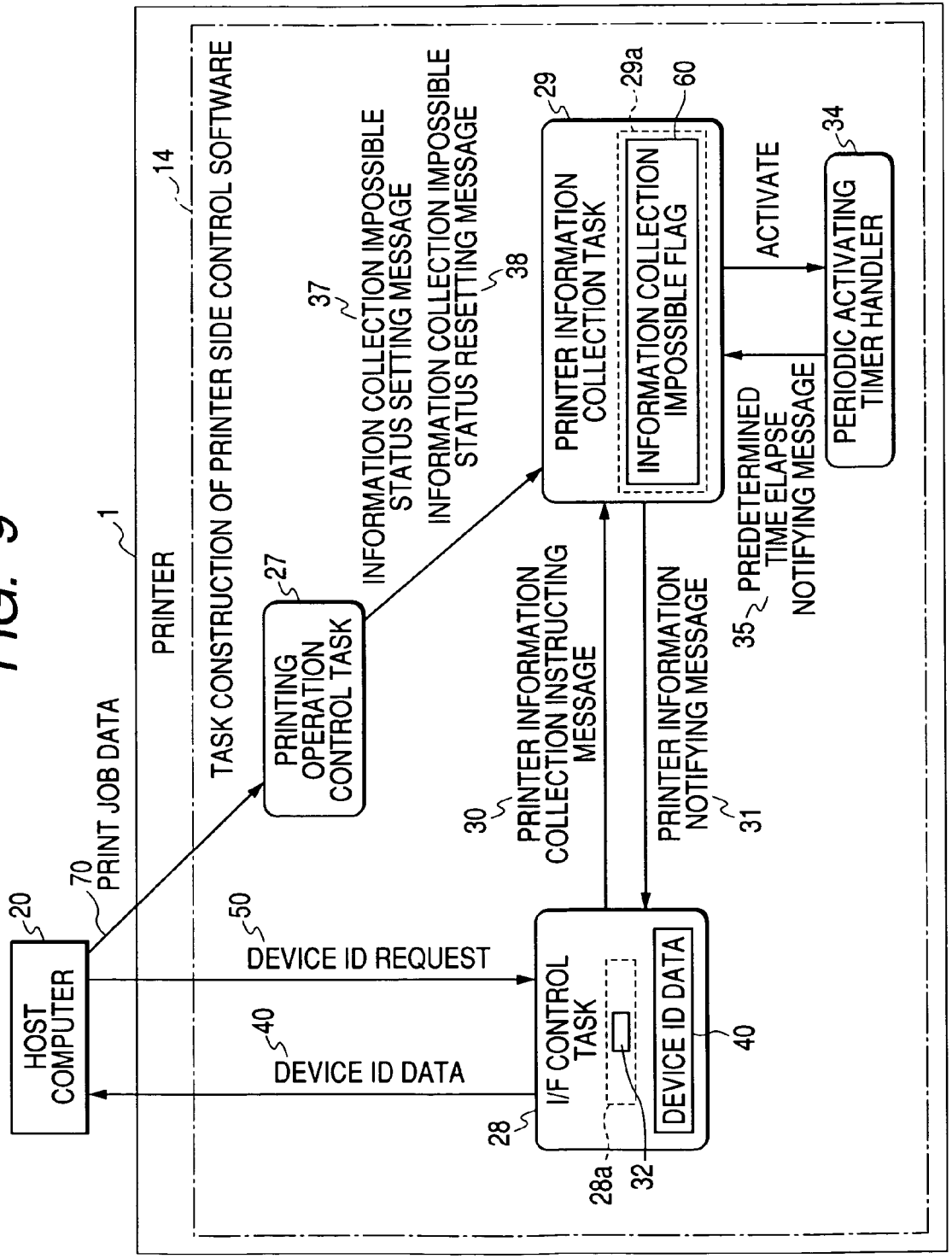
FIG. 9 is a block diagram showing a part of a task construction of printer side control software according to the second embodiment of the invention.

FIG. 9 shows a task construction of printer side control software which operates on the CPU 14.

An updating impossible status flag 36 showing the state where the latest printer information cannot be obtained has been added to the printer information notifying message 31 which is sent from the printer information collection task 29 to the interface control task 28.

An information collection impossible status setting message 37 and an information collection impossible status resetting message 38 are sent from the printing operation control task 27 to the printer information collection task 29.

Figure 10A:
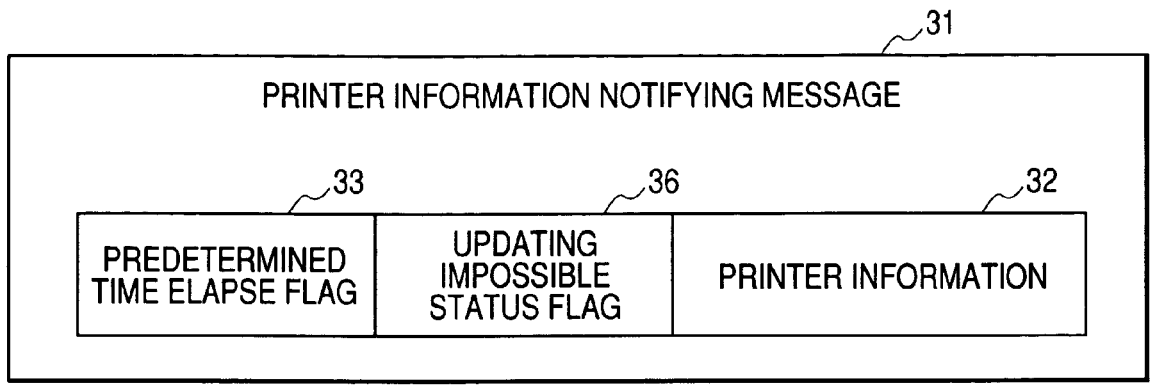
FIGS. 10A and 10B are explanatory diagrams each showing an example of a construction of information which is transferred.
Figure 10B:
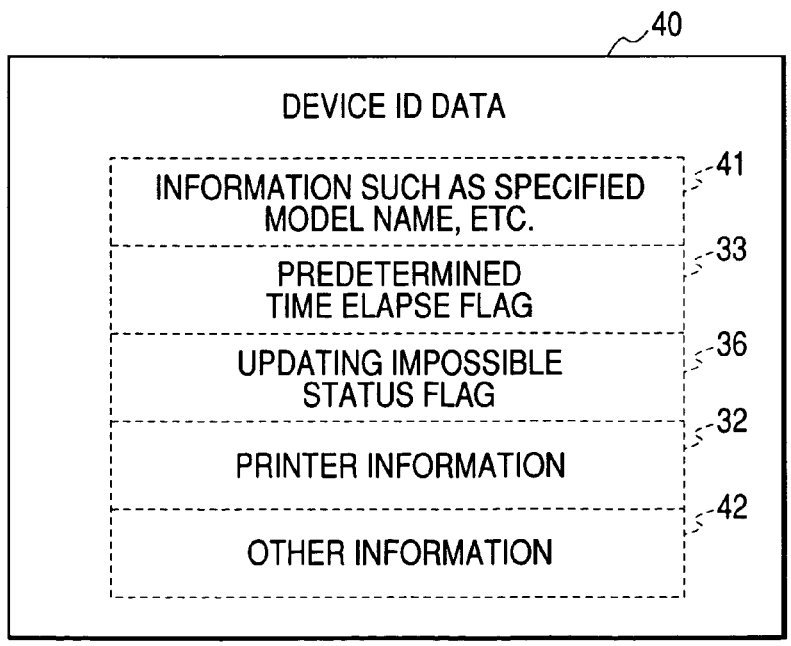

FIGS. 10A and 10B show contents of the information to be transferred.

FIG. 10A shows a construction of the printer information notifying message 31. Besides the printer information 32 and the predetermined time elapse flag 33, the updating impossible status flag 36 is included in the printer information notifying message 31. Contents corresponding to the set status of an information collection impossible flag 60 in a work area 29a are set into the updating impossible status flag 36.

FIG. 10B shows a construction of the device ID data 40. In addition to the specified information 41 such as a predetermined model name or the like, the predetermined time elapse flag 33, the printer information 32, and other information 42, the updating impossible status flag 36 is included in the device ID data 40.

<System Operation>

The operation of the present system will now be described.

(Printer Information Collection Task Process)

Figure 11:
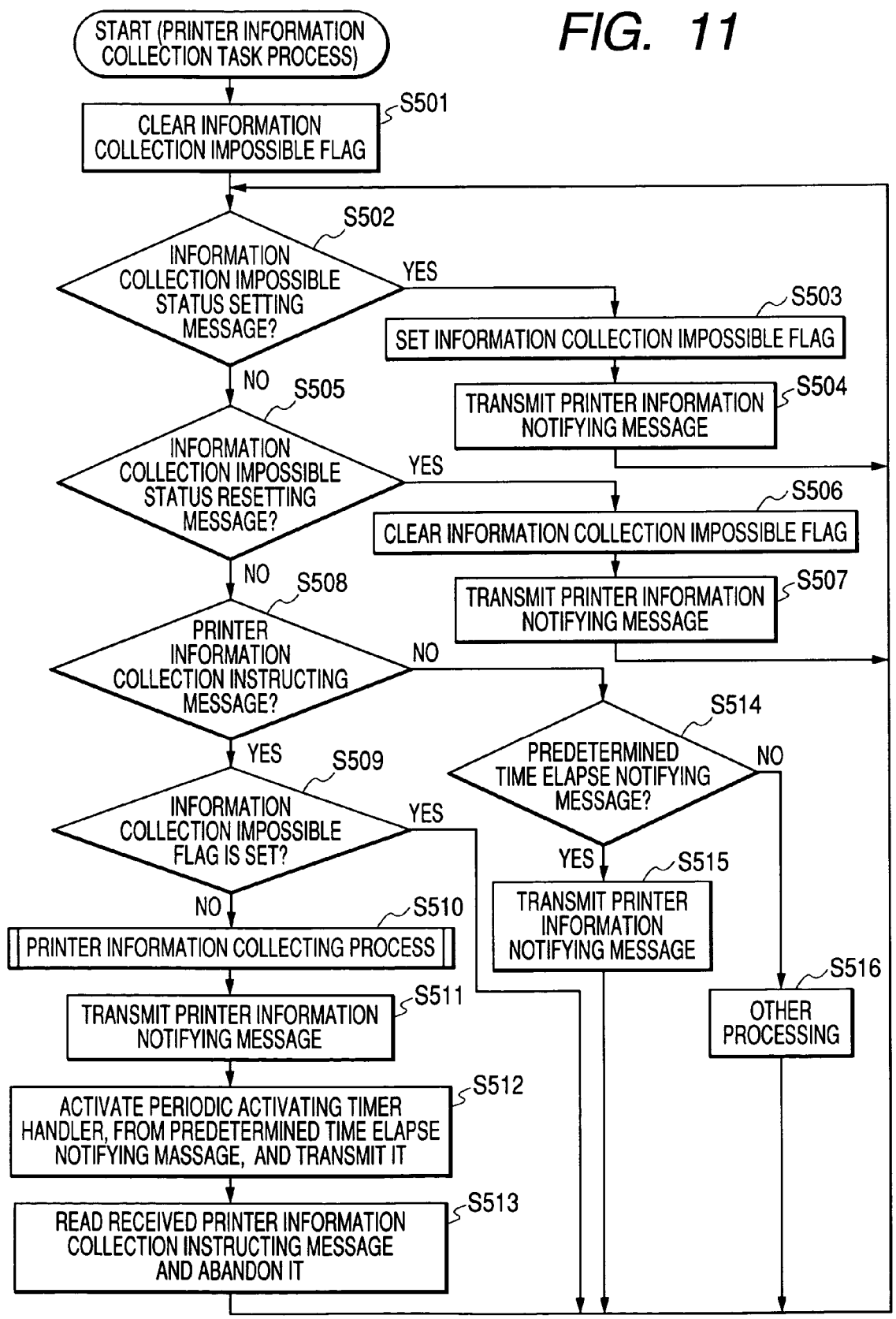
FIG. 11 is a flowchart showing a printer information collection task process.

FIG. 11 is a flowchart showing processing contents of the printer information collection task 29.

The printer information collection task 29 clears the information collection impossible flag 60 in its own work area 29a prior to executing all processes (step 501).

When the printer information collection task 29 receives the information collection impossible status setting message 37 from the printing operation control task 27 (step S502), the printer information collection task 29 sets the information collection impossible flag 60 to the high level (step S503) and sends the printer information notifying message 31 to the interface control task 28 (step S504).

At this time, as an updating impossible status flag 36 in the printer information notifying message 31 to be transmitted to the interface control task 28, the flag 36 which has been set in correspondence to the set status of the information collection impossible flag 60 set at that time is transmitted.

When the information collection impossible status resetting message 38 is received from the printing operation control task 27 (step S505), the information collection impossible flag 60 is cleared (step S506) and the printer information notifying message 31 is transmitted to the interface control task 28 (step S507).

At this time, as an updating impossible status flag 36 in the printer information notifying message 31 to be transmitted to the interface control task 28, the flag 36 which has been cleared in correspondence to the set status of the information collection impossible flag 60 set at that time is transmitted.

When the printer information collection instructing message 30 is received from the interface control task 28 (step S508), the printer information collection task 29 checks the information collection impossible flag 60 (step S509). If the information collection impossible flag 60 has been set to the high level, nothing is executed and the processing routine is returned to step S501.

If the information collection impossible flag 60 has been cleared, step S510 follows and the printer information collecting process is executed.

After completion of the printer information collecting process, the printer information notifying message 31 is transmitted to the interface control task 28 (step S511).

At this time, as for the predetermined time elapse flag 33 in the printer information notifying message 31 which is transmitted to the interface control task 28, since the notification of the predetermined time elapse notifying message 35 is not received and the predetermined time does not elapse, the cleared flag 33 is transmitted.

Subsequently, the printer information collection task 29 activates the periodic activating timer handler 34 and starts to measure the elapse of a predetermined time (step S512). The periodic activating timer handler 34 operates independent of the printer information collection task 29. When the periodic activating timer handler 34 is activated from the printer information collection task 29, it starts to measure the elapse of the predetermined time, forms the predetermined time elapse notifying message 35 after the elapse of a predetermined period of time, and sends the predetermined time elapse notifying message 35 to the printer information collection task 29.

The processing routine further advances to step S513 and if the next printer information collection instructing message 30 is received during the execution of the printer information collecting process, the received messages are read out and abandoned.

If the printer information collection instructing message 30 is not received from the interface control task 28 in step S508 and, further, the predetermined time elapse notifying message 35 is received from the periodic activating timer handler 34 in step S514, the printer information notifying message 31 is transmitted to the interface control task 28 (step S515).

At this time, as for the predetermined time elapse flag 33 in the printer information notifying message 31 which is transmitted to the interface control task 28, since the predetermined time has elapsed, the set flag 33 is transmitted.

(Printing Operation Control Task Process)

Figure 12:
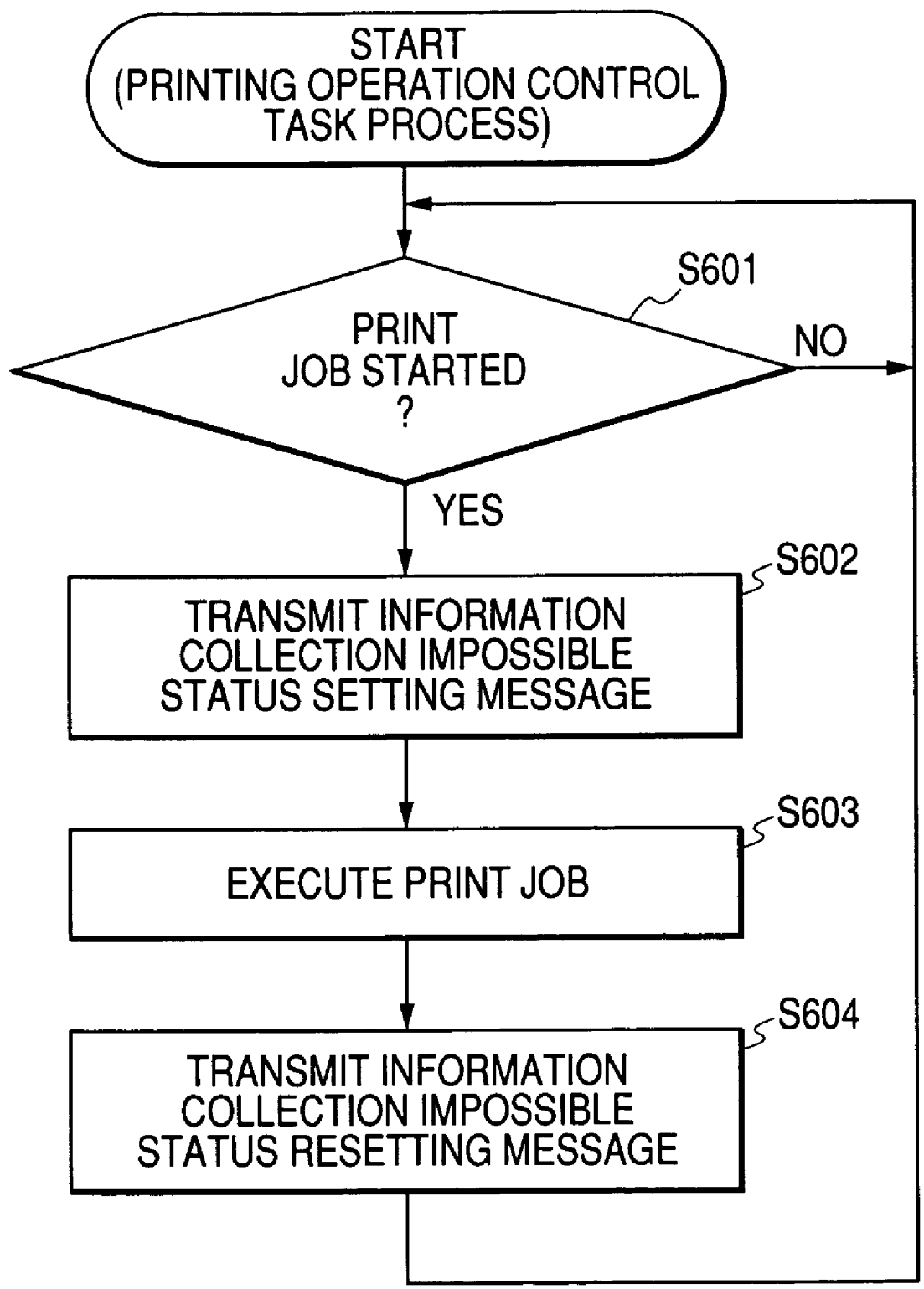
FIG. 12 is a flowchart showing a printing operation control task process.

FIG. 12 is a flowchart showing processing contents of the printing operation control task 27. When print job data 70 is received from the host computer 20 (step S601), first, the printing operation control task 27 transmits the information collection impossible status setting message 37 to the printer information collection task 29 (step S602). Subsequently, the print recording operation of the print job is executed (step S603). After completion of the print recording operation, the printer information collection impossible status resetting message 38 is transmitted to the printer information collection task 29 (step S604).

(Printer Information Obtaining Process on the Host Side)

Figure 13:
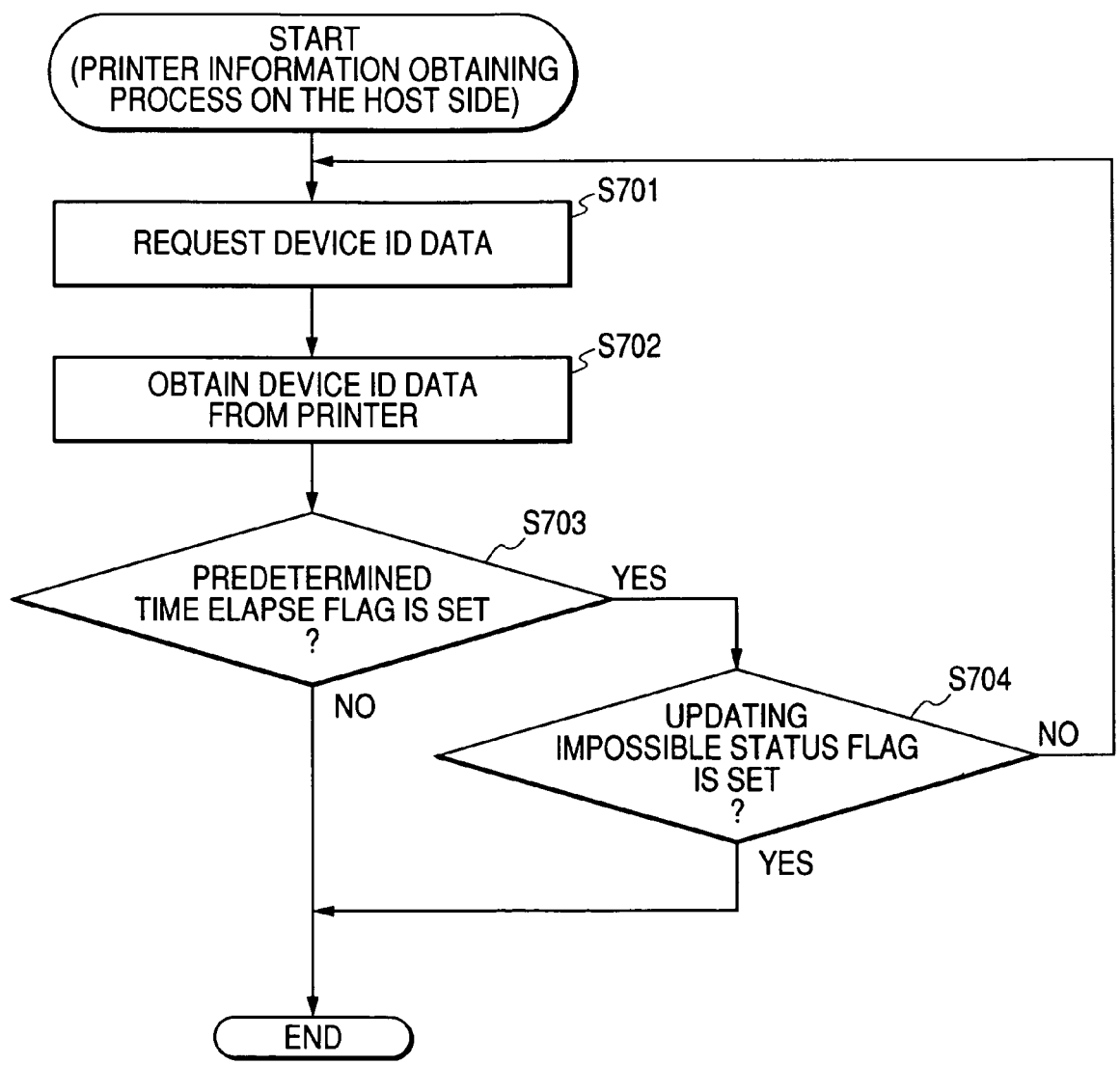
FIG. 13 is a flowchart showing a printer information obtaining process on the host computer side.

FIG. 13 is a flowchart showing processing contents in the case where the host computer 20 obtains the printer information 32.

In the case of obtaining the printer information 32, the host computer 20 makes the device ID request 50 for obtaining the device ID data 40 from the printer 1 (step S701).

After that, the device ID data 40 returned from the printer 1 is obtained in response to such a request (step S702).

The printer information 32 included in the returned device ID data 40 is examined. First, the predetermined time elapse flag 33 is discriminated (step S703).

If the predetermined time elapse flag 33 is not set, the printer information 32 obtained at that time is set as latest information and the printer information obtaining process is finished.

If the predetermined time elapse flag 33 has been set in step S703, step S704 follows and whether or not the updating impossible status flag 36 has been set is discriminated.

If the updating impossible status flag 36 has been set, this means that the information collection impossible flag 60 is set and the collection of the information is impossible. Therefore, the host computer 20 stops the continuation of the process for obtaining the latest printer information 32, the printer information 32 obtained at this point of time is set as latest information, and the printer information obtaining process is finished.

If the updating impossible status flag 36 has been cleared in step S704, this means that the information collection impossible flag 60 is cleared and the collection of the information is possible. Therefore, the processing routine is returned to step S701 and the device ID request 50 is repetitively made again to the printer 1.

The process of the interface control task 28 can be also the same as the process shown in the flowchart of FIG. 5 described in the embodiment 1.

The printer information collecting process (step S510) in the process of the printer information collection task 29 is the same as the process shown in the flowchart of FIG. 7 described in the embodiment 1 mentioned above.

By executing those processes, if the printer 1 is in the information updating impossible status, the host computer 20 does not carelessly enter an information updating waiting mode but can start the process on the basis of the result of the printer information collecting process executed last by the printer 1.

Although the embodiment has been described with respect to the case where the printer information cannot be collected while the printer 1 is executing the print job for simplicity of explanation, even in the case where the printer information cannot be collected due to another condition, the invention can be applied by similar processes.

As described above, in the case where the device ID data 40 is repetitively and continuously obtained until the host computer 20 obtains the latest printer information 32, there is also considered a case where the printer information 32 cannot be obtained, for example, during the printing operation or the like due to a mechanical structural or electrical limitation as an operation of the printer 1 side. In such a case, if the device ID data 40 is repetitively and continuously obtained until the host computer 20 obtains the latest printer information 32, there is a fear that the processes of the host computer 20 side are stopped during the printing operation or the like.

However, in the embodiment, since there is also considered the case where the printer 1 cannot execute the printer information collecting process in order to avoid such a stop state of the process on the host side as mentioned above, the working efficiency can be further improved.

Other Embodiments

The above embodiments 1 and 2 have been described with respect to the case where the type of recording medium 2 set on the paper feed tray 3 is detected and returned as printer information 32 which is returned to the host computer 20. However, the invention can be also effectively applied to the case of returning other information. For example, the invention can be also effectively applied to the case of detecting the size of recording medium 2 set on the paper feed tray 3 and returning it.

The invention can be also effectively applied to the case of detecting operating states of various levers provided on the surface of the apparatus of the printer 1 and returning them, the case of returning the attaching states of various optional devices which can be attached to the printer 1, or the like.

As described above, when the host computer 20 wants to obtain the printer information 32, the latest printer information can be certainly obtained. In the'state where the host computer 20 does not need the printer information 32, the printer 1 side does not need to execute the printer information collecting process. Therefore, it is possible to construct the apparatus so that the printer information collecting process than it is needed is not executed and the working efficiency can be improved to the maximum.

Since the printer 1 side completes the response of the device ID itself irrespective of whether or not the obtainment of the printer information 32 is executed, when the host computer 20 issues the device ID request 50 for the purpose other than the purpose of obtaining the printer information 32, even if the predetermined time elapse flag 33 has been set, the repetitive obtainment of the device ID data 40 is not executed but finished and it is sufficient to ignore the printer information 32. Thus, such a problem that the next process of the host computer 20 side is delayed does not occur and the working efficiency can be further improved.

Further, if the collecting process of the latest printer information 32 cannot be executed while the printer 1 is executing the operation other than the collecting process of the latest printer information 32, the host computer 20 does not execute the obtaining process of the latest printer information 32. Therefore, the non-periodic obtaining process of the printer 1 side is not always forcedly executed but executed in consideration of the operating situation of the printer 1 side also. Thus, the wasteful operations of not only the host computer 20 but also the printer 1 are eliminated and the working efficiency can be improved to the maximum.

The invention can be applied to not only a system comprising a plurality of apparatuses (for example, a host computer, an interface apparatus, a reader, a printer, and the like) but also an apparatus comprising one apparatus (for example, a small image processing apparatus such as a PDA (personal information managing) apparatus, a copying apparatus, or a facsimile apparatus).

Naturally, the invention can be applied to a case where it is accomplished by supplying a program to a system or an apparatus. The effects of the invention can be also obtained by a method whereby a storing medium in which a program shown by software for accomplishing the invention has been stored is supplied to the system or apparatus and a computer (or a CPU or an MPU) of the system or apparatus reads out program codes stored in the storing medium and executes them.

In this case, the program codes themselves read out from the storing medium realize the functions of the embodiments mentioned above and the storing medium in which the program codes have been stored constructs the invention.

As a storing medium for supplying the program codes, for example, a floppy disk, a hard disk, an optical disk, a magnetooptic disk, a CD-ROM, a CD-R, a magnetic tape, a nonvolatile memory card (IC memory card), a ROM (mask ROM, flash EEPROM, etc.), or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes.

Further, naturally, the invention incorporates a case where the program codes read out from the storing medium are written into a memory provided for a function expanding board inserted in a computer or a function expanding unit connected to the computer and, thereafter, a CPU or the like provided for the function expanding board or the function expanding unit executes a part or all of actual processes on the basis of instructions of the program codes and the functions of the embodiments mentioned above are realized by those processes.

As preferred examples of the master apparatus, there are an information processing apparatus such as personal computer, work station, and the like. As preferred examples of the slave apparatus, there are a printer, a copying apparatus, an image forming apparatus including a hybrid apparatus of them, and a peripheral apparatus such as a digital camera or the like.

This application claims priority from Japanese Patent Application No. 2003-344932 filed Oct. 2, 2003, which is hereby incorporated by reference herein.

What is claimed is:

1. A method of obtaining status information showing a status of a peripheral apparatus by an information processing apparatus in a system including the information processing apparatus and the peripheral apparatus which are mutually connected by an interface, comprising the steps of:

allowing the peripheral apparatus to discriminate whether or not a device ID request has been made by the information processing apparatus;

when it is determined that the device ID request has been made, allowing the peripheral apparatus to return device ID information including the latest status information to the information processing apparatus and start a status information collecting process for newly collecting status information after the return of the device ID information;

allowing the peripheral apparatus to measure whether or not a predetermined time has elapsed from a point of time after completion of the latest status information collecting process; and allowing the peripheral apparatus to return period elapse information showing whether or not the predetermined time has elapsed on the basis of a result of the measurement to the information processing apparatus together with the device ID information.

2. A method according to claim 1, further comprising the steps of:
   allowing the information processing apparatus to analyze the period elapse information returned from the peripheral apparatus together with the device ID information and discriminate whether or not the predetermined period has elapsed;
   if it is determined that the predetermined period has elapsed, allowing the information processing apparatus to make the device ID request to the peripheral apparatus; and
   if it is determined that the predetermined period does not elapse, allowing the information processing apparatus not to make the device ID request to the peripheral apparatus.

3. A method according to claim 1, wherein
   the period elapse information is set in the status information as a first flag showing whether or not the predetermined period has elapsed from the point of time after completion of the new status information collecting process,
   and the method further comprises the steps of:
   if the device ID request has been made by the information processing apparatus for the predetermined period of time from the point of time after completion of the new status information collecting process, allowing the peripheral apparatus to clear and return the first flag; and
   if the device ID request has been made by the information processing apparatus after the elapse of the predetermined period of time from the point of time after completion of the new status information collecting process, allowing the peripheral apparatus to set and return the first flag.

4. A method according to claim 3, further comprising the steps of:
   if the status information in which the first flag has been set is obtained, allowing the information processing apparatus to repetitively execute an obtaining process for newly obtaining the device ID information; and
   if the status information in which the first flag has been cleared is obtained, allowing the information processing apparatus to execute a predetermined process on the basis of the obtained status information without obtaining the device ID information in a process after a point of time of the obtainment.

5. A method according to claim 3, further comprising the step of:
   even if the first flag has been set in the obtaining process of the device ID information which does not need the status information, allowing the information processing apparatus not to execute the obtaining process for repetitively obtaining the device ID information.

6. A method according to claim 1, further comprising the step of:
   if the device ID request has been made by the information processing apparatus during execution of the new status information collecting process, allowing the peripheral apparatus not to start the status information collecting process in response to the device ID request.

7. A method according to claim 1, further comprising the step of:
   if the device ID request has been made by the information processing apparatus for a time interval until the elapse of the predetermined time from the point of time after completion of the new status information collecting process, allowing the peripheral apparatus not to start the status information collecting process in response to the device ID request.

8. A method according to claim 1, further comprising the steps of:
   allowing the peripheral apparatus to discriminate whether or not the status information collecting process can be executed during execution of an operation other than the status information collecting process; and
   allowing the peripheral apparatus to return collection impossible information showing whether or not the status information collecting process can be executed on the basis of a result of the discrimination to the information processing apparatus together with the device ID information.

9. A method according to claim 8, further comprising the steps of:
   allowing the information processing apparatus to analyze the collection impossible information returned from the peripheral apparatus together with the device ID information and discriminate whether or not the peripheral apparatus can execute the status information collecting process;
   if it is determined that the status information collecting process can be executed, allowing the information processing apparatus to make the device ID request to the peripheral apparatus; and
   if it is determined that the status information collecting process cannot be executed, allowing the information processing apparatus not to make the device ID request to the peripheral apparatus.

10. A method according to claim 8, wherein the collection impossible information is set in the status information as a second flag showing that the status information cannot be updated, and
   the method further comprises the step of, if the device ID request has been made by the information processing apparatus, when the apparatus is executing an operation other than the status information collecting process and in the state where it cannot execute the status information collecting process, allowing the peripheral apparatus to set and return the second flag.

11. A method according to claim 10, further comprising the step of:
   when the status information in which the second flag has been set is obtained, even in the case of the status information in which the first flag has been set, allowing the information processing apparatus to execute a predetermined process on the basis of the status information at the point of time of the obtainment.

12. A method according to claim 1, wherein the status information is a type of recording media set on a paper feed tray of the peripheral apparatus.

13. A method according to claim 1, wherein the status information is a size of recording media set on a paper feed tray of the peripheral apparatus.

14. A method according to claim 1, wherein the status information is a state of a switch or a lever provided for the peripheral apparatus.

15. A method according to claim 1, wherein the status information is an attaching state of an option apparatus which can be selectively attached and removed to/from the peripheral apparatus.

16. A control program which has been stored in a computer-readable medium and allows a computer to execute a method whereby an information processing apparatus obtains status information showing a status of a peripheral apparatus in a system including the information processing apparatus and the peripheral apparatus which are mutually connected by an interface, comprising the steps of:

allowing the peripheral apparatus to discriminate whether or not a device ID request has been made by the information processing apparatus;

when it is determined that the device ID request has been made, allowing the peripheral apparatus to return device ID information including the latest status information to the information processing apparatus and start a status information collecting process for newly collecting status information after the return of the device ID information;

allowing the peripheral apparatus to measure whether or not a predetermined time has elapsed from a point of time after completion of the latest status information collecting process; and allowing the peripheral apparatus to return period elapse information showing whether or not the predetermined time has elapsed on the basis of a result of the measurement to the information processing apparatus together with the device ID information.

* * * * *